United States Patent [19]

Maurer et al.

[11] Patent Number: 5,478,114

[45] Date of Patent: Dec. 26, 1995

[54] AIR BAG TETHER ASSEMBLY

[75] Inventors: Steven W. Maurer, Clinton Township; Matthew C. Bollaert, Capac; Jeffrey C. Synor, Utica, all of Mich.

[73] Assignee: TRW Vehicle Safety Systems Inc., Lyndhurst, Ohio

[21] Appl. No.: 259,871

[22] Filed: Jun. 15, 1994

[51] Int. Cl.$^6$ ................................................ B60R 21/16
[52] U.S. Cl. ............................................ 280/743.2
[58] Field of Search ................ 280/743 A, 743 R, 280/730 A, 730 R, 728 R, 728 A, 729, 742, 731, 732, 743.2, 743.1, 730.2, 730.1, 728.1, 728.2, 729, 742, 731, 732

[56] References Cited

U.S. PATENT DOCUMENTS

| | | | |
|---|---|---|---|
| 4,934,734 | 6/1990 | Takada | 280/743 A |
| 4,966,389 | 10/1990 | Takada | 280/743 A |
| 5,033,771 | 7/1991 | Miyauchi et al. | 280/743 A |
| 5,078,423 | 1/1992 | Fujita | 280/743 A |
| 5,186,489 | 2/1993 | Imai | 280/743 A |
| 5,308,113 | 5/1994 | Moriset | 280/743 A |

FOREIGN PATENT DOCUMENTS

| | | | |
|---|---|---|---|
| 0584782 | 3/1994 | European Pat. Off. | 280/729 |
| 611683 | 8/1994 | European Pat. Off. | |
| 0085549 | 6/1986 | Japan | 280/743 R |
| 4283145 | 10/1992 | Japan | 280/728 R |
| 5238347 | 9/1993 | Japan | 280/730 A |
| 5238346 | 9/1993 | Japan | 280/743 R |
| 4006652 | 3/1994 | WIPO | 280/743 A |

Primary Examiner—Margaret A. Focarino
Assistant Examiner—Peter C. English
Attorney, Agent, or Firm—Tarolli, Sundheim & Covell

[57] ABSTRACT

A tether assembly (10) for an inflatable restraint (16) such as an air bag includes a tether strap (30) and first and second intermediate pads (32, 34). A first end portion (42) of the tether strap is joined to the first intermediate pad (32) by a circular first stitching section (54). The first intermediate pad (32) is joined to a first panel (12) of the air bag by a circular second stitching section (56) which is disposed laterally outside of the tether strap first end portion (42). A second end portion (44) of the tether strap is joined to the second intermediate pad (34) by a circular first stitching section (66). The second intermediate pad (34) is joined to a second panel (14) of the air bag by a circular second stitching section (68) which is disposed laterally outside of the tether strap second end portion (44). The second stitching sections (56, 68) are larger in diameter than the first stitching sections (54, 66).

23 Claims, 4 Drawing Sheets

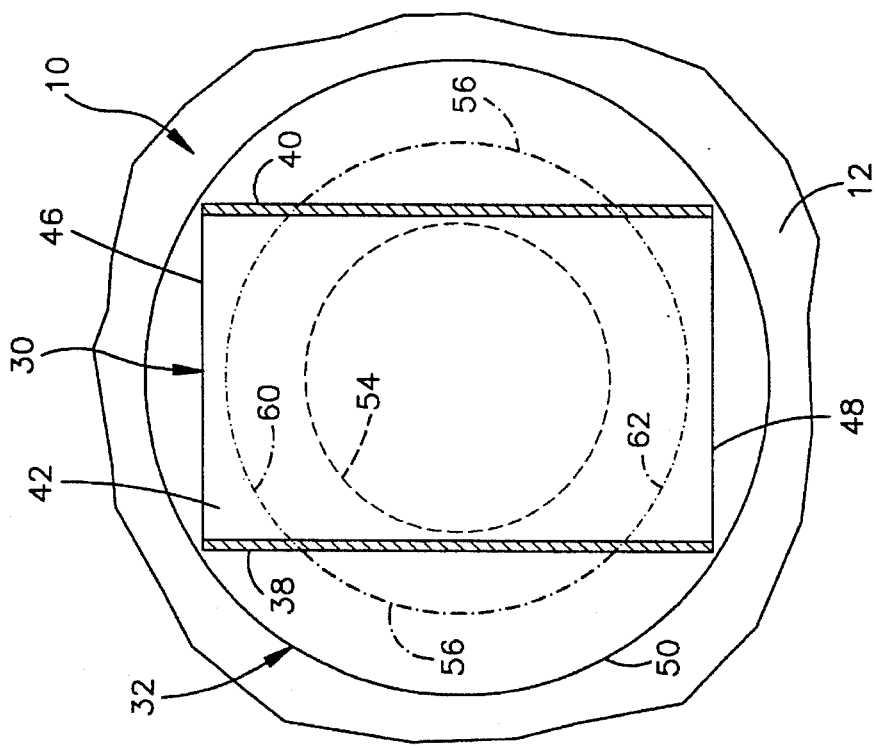
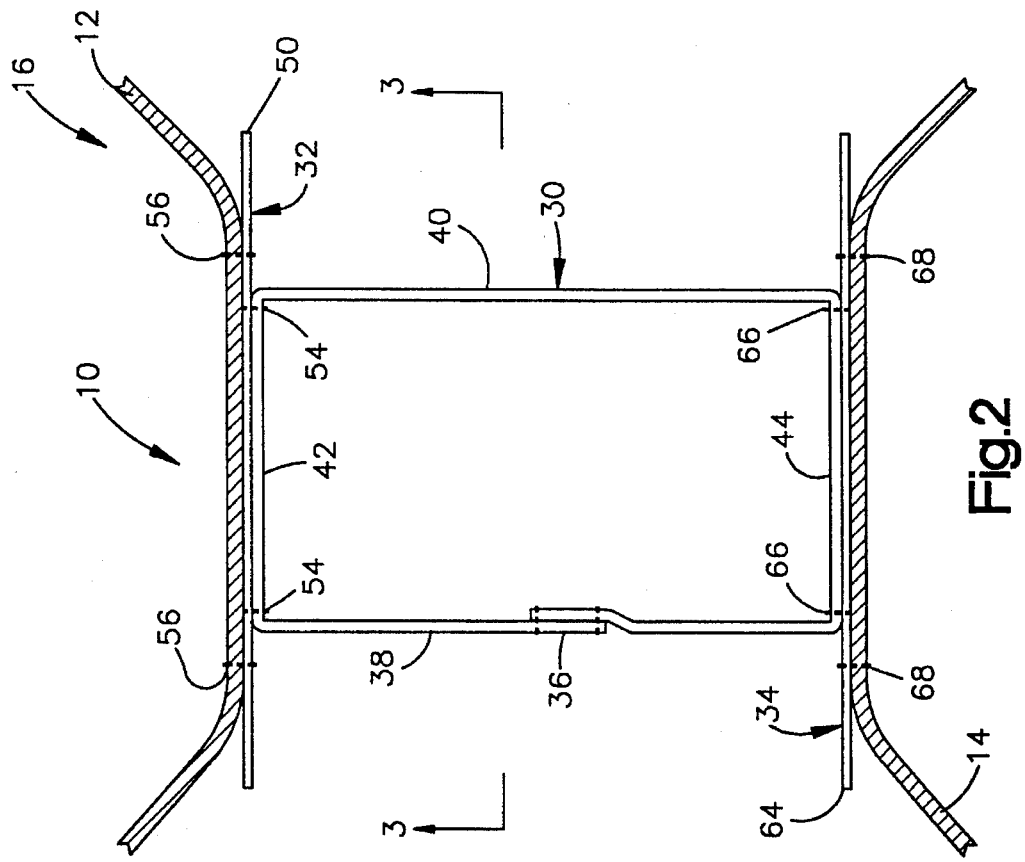

AIR BAG TETHER ASSEMBLY

BACKGROUND OF THE INVENTION

1. Technical Field

The present invention relates to a vehicle occupant restraint. In particular, the present invention relates to a tether assembly for an inflatable vehicle occupant restraint such as an air bag.

2. Description of the Prior Art

An inflatable vehicle occupant restraint such as an air bag is used to restrain a vehicle occupant in the event of sudden deceleration such as occurs in a vehicle collision. A typical air bag includes fabric panels which define an inflation fluid volume. When inflation fluid under pressure is supplied to the air bag, the panels move apart from each other as the air bag assumes an inflated condition.

It is known to use tethers extending between the panels of an air bag to control the shape of the air bag when inflated. The tethers are typically straps of fabric material disposed inside the air bag and having opposite ends stitched to the air bag panels. When the air bag becomes fully inflated, the tethers extend fully and stop further movement of the panels away from each other. This places a sudden shock load on the tethers, on the panels, and on the stitching which joins the tethers to the panels.

The material of the air bag panels is typically thinner and lighter than the material of the tethers and the stitching material itself. Thus, the strength of the material of the air bag panels determines the maximum load that can be applied to the tethers. The highest load per unit area of panel material occurs where the panels are stitched to the tethers, as this is where the load is transmitted between the relatively strong material of the tethers and the weaker material of the panels.

SUMMARY OF THE INVENTION

The present invention is an inflatable vehicle occupant restraint such as an air bag for, when inflated, restraining a vehicle occupant. The inflatable restraint has an uninflated condition and an inflated condition. The inflatable restraint includes first and second panels spaced from each other when the inflatable restraint is in the inflated condition. Tether means is connected between the first and second panels for resisting movement of the first panel away from the second panel. The tether means includes a tether strap having first and second end portions and an intermediate portion extending between the first and second end portions, and a pad intermediate the first end portion of the tether strap and the first panel. A first stitching section joins the first end portion of the tether strap to the intermediate pad. A second stitching section joins the intermediate pad to the first panel at a location disposed laterally outside the first end portion and spaced from the first stitching section to connect the first end portion of the tether strap to the first panel.

In a preferred embodiment of the invention, a circular first stitching section joins the tether strap first end portion to the intermediate pad, and a larger diameter circular second stitching section joins the intermediate pad to the first panel. The first stitching section is disposed within the edges of the tether strap first end portion and is free of engagement with the first panel. The second stitching section is disposed outside of the edges of the tether strap first end portion and is free of engagement with the tether strap. Because the second stitching section is larger in circumference than the first stitching section, the second stitching section transmits less load per stitch, or per unit area or length, than does the first stitching section. Accordingly, the load is spread out over a greater stitching area and over a greater amount of material of the air bag panel.

The tether assembly may include a plurality of tether straps disposed in an array between the first and second panels, and means for distributing the force of inflation of the vehicle occupant restraint between the tether straps. The force distribution means comprises a center pad connected between respective central portions of the plurality of tether straps.

The tether assembly may include a plurality of tether straps having an unextended condition when the vehicle occupant restraint is in the uninflated condition and having an extended condition when the vehicle occupant restraint is in the inflated condition. In one embodiment, a stretchable member is connected between the tether straps for resisting movement of the tether straps from the unextended condition to the extended condition. The stretchable member has a first length when the tether straps are in the unextended condition and has a second length greater than the first length when the tether straps are in the extended condition.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 is a top view of the tether assembly of FIG. 1;

FIG. 3 is a sectional view taken along line 3—3 of FIG. 2;

DESCRIPTION OF PREFERRED EMBODIMENTS OF THE INVENTION

Figure 1:
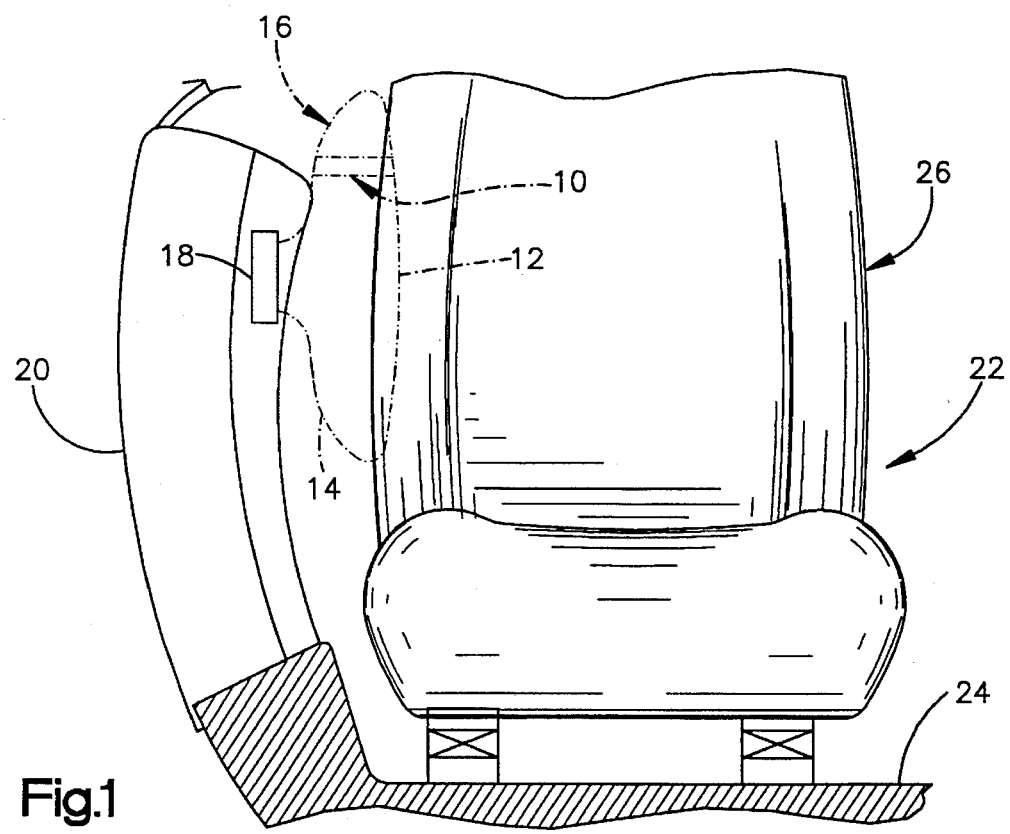
FIG. 1 is a pictorial view of a vehicle occupant restraint system including a tether assembly in accordance with the present invention.

The present invention relates to a vehicle occupant restraint and, in particular, to a tether assembly for an inflatable vehicle occupant restraint such as an air bag. The present invention is applicable to various tether assembly constructions. As representative of the present invention, FIG. 1 illustrates a tether assembly 10.

The tether assembly 10 extends between and interconnects a first panel 12 and a second panel 14 of an air bag 16. The panels 12 and 14 may be separate pieces of fabric which are sewn or otherwise joined together or may be different portions of a single piece of fabric. The panels 12 and 14 at least partially define between them an inflation fluid volume in the air bag 16. The air bag 16 is associated with an inflator 18 mounted in a door 20 of a vehicle 22. A body 24 of the vehicle 22 supports a seat 26, illustrated as a front passenger seat of the vehicle, adjacent to the inflator 18. The inflator 18 is actuatable in a known manner to inflate the air bag 16 to restrain an occupant of the seat 26 in the event of a side impact to the vehicle 22.

It should be understood that the air bag 16 can be mounted in other vehicle locations to protect against a side impact, such as a head rest, a seat, a roof rail, or a B-pillar of the vehicle 22. It should further be understood that a tether assembly constructed in accordance with the present invention can be incorporated in an air bag other than a side impact air bag.

The tether assembly 10 (FIGS. 2 and 3) includes a tether strap 30, a first tether pad 32, and a second tether pad 34. The tether strap 30 is a flat elongate piece of fabric material with its two ends sewn together at 36 to form a loop. The tether strap 30 includes two intermediate portions 38 and 40. The tether strap intermediate portions 38 and 40 extend parallel to each other and lie in planes that are oriented transversely of the planes in which the air bag panels 12 and 14 lie, when the air bag 16 is in the inflated condition illustrated in FIG. 2.

The tether strap 30 has a first end portion 42 and a second end portion 44. The tether strap end portions 42 and 44 extend between the intermediate portions 38 and 40 of the tether strap 30. The tether strap end portions 42 and 44 are those portions of the tether strap 30 which extend parallel to the air bag panels 12 and 14 when the air bag 16 is in the inflated condition illustrated in FIG. 2. The tether strap end portions 42 and 44 extend transverse to the intermediate portions 38 and 40, and parallel to each other and to the air bag panels 12 and 14.

Each of the tether strap end portions 42 and 44 has a generally rectangular configuration. For example, the tether strap first end portion 42 (FIG. 3) has a generally rectangular configuration as defined by the intermediate portions 38 and 40 of the tether strap 30 and by two edges 46 and 48 extending between the intermediate portions.

The first tether pad 32 is disposed intermediate the air bag first panel 12 and the first end portion 42 of the tether strap 30. The first tether pad 32 (FIGS. 2 and 3) is circular in configuration and has an outer periphery 50.

The first tether pad 32 is sewn to the tether strap first end portion 42 with stitches that are arranged in a circular pattern to form a circular first stitching section 54. The first stitching section 54 is concentric with the first tether pad 32. The first stitching section 54, as can be seen in FIG. 3, extends entirely within the tether strap first end portion 42 as defined by the intermediate portions 38 and 40 and the edges 46 and 48. The stitching section 54 does not cross any of the edges of the piece of fabric material which forms the tether strap 30.

The first tether pad 32 is sewn to the air bag first panel 12 with stitches that are arranged in a circular pattern to form a circular second stitching section 56. The second stitching section 56 is concentric with and has a greater diameter than the first stitching section 54. The first tether pad 32 and the air bag first panel 12 are joined by the second stitching section 56 at a location disposed laterally outside of the tether strap first end portion 42. The second stitching section 56 is disposed entirely outside of the tether strap outer end portion 42 as defined by the intermediate portions 38 and 40 and the edges 46 and 48. The second stitching section 56 does not extend across any of the edges of the piece of fabric material which forms the tether strap 30. The second stitching section 56 is disposed entirely within the outer periphery 50 of the first tether pad 32.

It should be understood that a tether assembly constructed in accordance with the present invention can include stitching sections which have a configuration other than a circular configuration. A circular configuration is preferred. However, stitching sections which have, for example, an oval or elliptical configuration can be included in a tether assembly constructed in accordance with the present invention. All such forms of stitching sections are, for convenience, referred to herein as "curved". When a tether assembly includes two curved stitching sections, such as the stitching sections 54 and 56, the two stitching sections should be concentric. The two stitching sections should be spaced apart from each other by the same distance over their entire extent.

It should also be understood that, because the first stitching section 54 is circular in shape, parts of the tether strap first end portion 42 may hang down from the stitching section 54 and be spaced apart from the first tether pad 32 when the air bag 16 is not in the inflated condition shown in FIG. 2. These parts of the end portion 42 move outward against and overlie the first tether pad 32 and the second stitching section 56, as shown in FIG. 2, when the fluid pressure in the air bag 16 increases sufficiently to flatten the tether strap first end portion. At that time, arcuate segments of the circular second stitching section 56, indicated at 60 and 62 (FIG. 3), are disposed between the flattened end portion 42 and the first tether pad 32. The second stitching section 56 does not extend through the tether strap end portion 42 at these locations.

The second tether pad 34 (FIG. 2) is identical to the first tether pad 32. The second tether pad 34 is circular in configuration and has an outer periphery 64. The second tether pad 34 is disposed intermediate the tether strap second end portion 44 and the air bag second panel 14.

The second tether pad 34 is sewn to the tether strap second end portion 44 with stitches that are arranged in a circular pattern to form a circular first stitching section 66. The first stitching section 66 is concentric with the second tether pad 34. The first stitching section 66 is disposed entirely within the boundaries of the tether strap second end portion 44.

The second tether pad 34 is sewn to the air bag second panel 14 with stitches that are arranged in a circular pattern to form a circular second stitching section 68. The second stitching section 68 is concentric with and greater in diameter than the first stitching section 66. The second stitching section 68 is disposed laterally outside of the tether strap second end portion 44. The second stitching section 68 is disposed entirely inside the outer periphery 64 of the second tether pad 34.

In the event of a side impact to the vehicle 22, such as occurs in a vehicle collision, the inflator 18 (FIG. 1) is actuated in a known manner to direct inflation fluid into the inflation fluid volume between the air bag panels 12 and 14. The pressure of the inflation fluid in the air bag 16 causes the first panel 12 to move in a direction away from the second panel 14 as the air bag 16 assumes an inflated condition. As this relative movement of the air bag panels 12 and 14 occurs, the tether assembly 10 extends from the collapsed position in which it is disposed when the air bag 16 is not inflated.

The tether assembly 10, as it becomes fully extended as shown in FIG. 2, resists movement of the first panel 12 away from the second panel 14. Because of the fluid pressure in the air bag 16 between the panels 12 and 14, a tensile load is placed on the tether assembly 10 in a direction extending between the first panel 12 and the second panel 14. This tensile load stresses the tether strap 30.

The load is transmitted from the tether strap 30, through the first stitching sections 54 and 66, and into the tether pads 32 and 34. The tether pads 32 and 34 transmit the load through the second stitching sections 56 and 68 to the air bag panels 12 and 14. The second stitching sections 56 and 68 are greater in diameter than the first stitching sections 54 and 66 and transmit the same load as the first stitching sections. Therefore, the second stitching sections 56 and 68 transmit less load per stitch, or per unit of length, than do the first stitching sections 54 and 66. Accordingly, the load transmitted by the tether assembly 10 is spread out over an increased number of stitches and over a greater amount of material of the air bag panels 12 and 14. This minimizes the load per unit of area in the material of the panels 12 and 14 at the location of the second stitching sections 56 and 68.

The circular shape of the stitching sections also reduces stress on the parts of the tether assembly 10 and on the air bag panels 12 and 14. The circular stitching sections have no corners and thus no localized stress points. In comparison, a typical box-stitch sewing pattern, which is rectangle with an X inside, has high stress points at the corners of the rectangle.

Further, the present invention minimizes shear stress in the stitching material used in the various component parts of the air bag 16 including the tether assembly 10. Because the tether assembly 10 includes not one but two intermediate portions 38 and 40, the air bag panels 12 and 14 are held parallel to each other when the air bag 16 is in the inflated condition shown in FIG. 2. This keeps the stitched connections in tension, where the stitching material is stronger, rather than in shear.

More than one tether assembly 10 may be included in an air bag such as the air bag 16. Tether assemblies 10 of a sufficient number and of appropriate dimensions are preferably used to tailor and control the shape of the inflated air bag 16. The tether assemblies of the present invention are especially useful in side impact air bags, which typically experience higher fluid pressures and consequently greater loads on tethers.

The tether pads 32 and 34, and the tether strap 30, are preferably made of standard air bag tether fabric material such as woven nylon fabric. The tether pads 32 and 34, and the tether strap 30, may be cut from selvage, straight or at a bias. The dimensions of the parts are selected dependent on the desired dimensions of the air bag 16 when inflated and on the fluid pressure in the air bag. One tether assembly 10 has been constructed using a three-inch wide tether strap 30, a two-inch diameter stitching section 54, a three-inch diameter stitching section 56, a four-inch diameter first tether pad 32, and a 3.9 inch distance between the panels 12 and 14.

Figure 5:
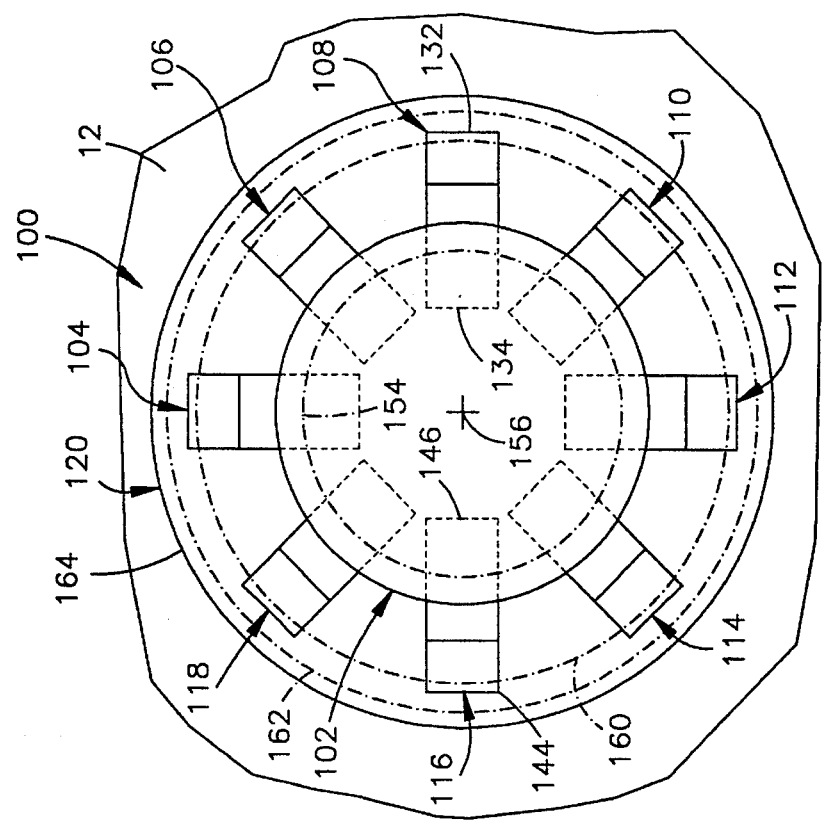
FIG. 5 is a sectional view taken along line 5—5 of FIG. 4.
Figure 4:
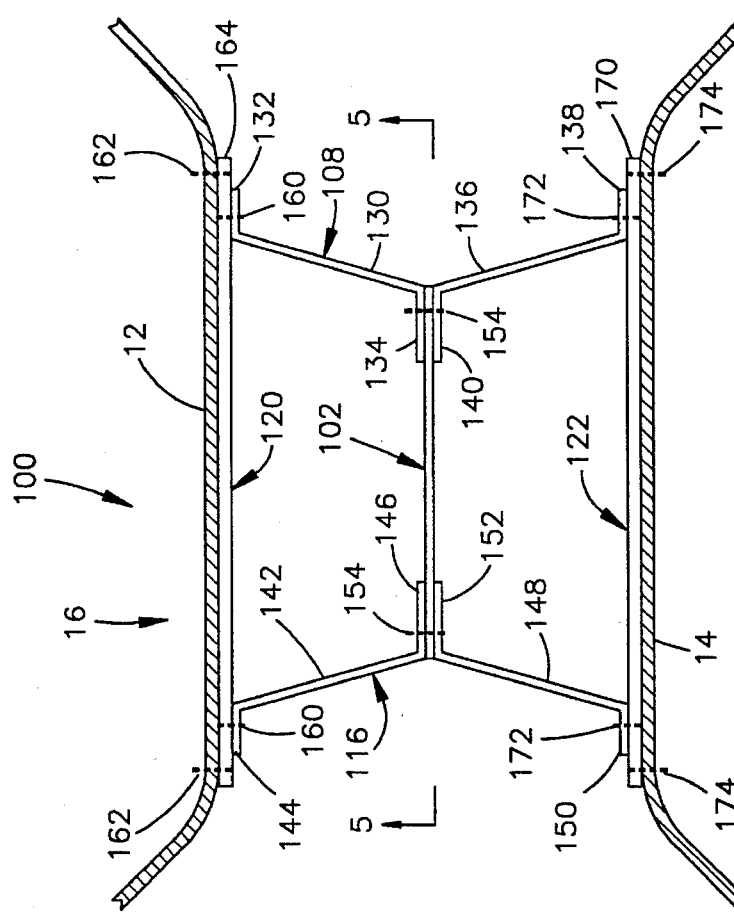
FIG. 4 illustrates a tether assembly in accordance with a second embodiment of the invention.

FIGS. 4 and 5 illustrate a tether assembly 100 in accordance with a second embodiment of the invention. The tether assembly 100 may be used in the air bag 16 in place of the tether assembly 10 illustrated in FIGS. 1–3. Thus, the tether assembly 100 is illustrated in FIGS. 4 and 5 as interconnecting the air bag panels 12 and 14.

The tether assembly 100 includes a circular center pad 102 which interconnects eight tether straps 104, 106, 108, 110, 112, 114, 116, and 118 (FIG. 5). For clarity, FIG. 4 shows only the tether straps 108 and 116, and does not show the tether straps 104, 106, 110, 112, 114 and 118, which are identical in construction to the tether straps 108 and 116. The tether straps 104–118 are disposed in a circular array at equal angular spacings around an axis 156 of the tether assembly 100. The tether assembly 100 also includes a first tether pad 120 and a second tether pad 122.

Each tether strap 104–118 is made of two strap members joined together by sewing to the center pad 102. For example, the tether strap 108 (FIG. 4) includes a first strap member 130 having an outer end portion 132 and a central end portion 134. The tether strap 108 also includes a second strap member 136 having an inner end portion 138 and a central end portion 140. The tether strap 116 likewise includes a first strap member 142 having an outer end portion 144 and a central end portion 146. The tether strap 116 includes a second strap member 148 having an inner end portion 150 and a central end portion 152.

The central end portions of all of the tether strap members of the tether assembly 100 are joined to each other, and to the center pad 102, by stitches that are arranged in a circular stitching section 154. The stitching section 154 extends in a circular pattern with an axis 156 as its center. The stitching section 154 joins all the tether straps 104–118 to the center pad 102 and to each other. The center pad 102 extends generally parallel to the panels 12 and 14 and transverse to the tether straps 104–118 when the air bag 16 is in the inflated condition.

The first tether pad 120 is circular in shape with an outer periphery 164. The first tether pad is disposed intermediate the first panel 12 of the air bag 16 and the outer end portions of the tether straps 104–118. The outer end portions of the tether straps 104–118 are sewn to the first tether pad 120 by stitches that are arranged in a circular pattern to form a circular stitching section 160. The circular stitching section 160 is concentric with and larger in diameter than the stitching section 154. The stitching section 160 connects all of the tether straps 104–118 to the first tether pad 120.

The first tether pad 120 is sewn to the air bag first panel 12 by stitches that are arranged in a circular pattern to form a circular stitching section 162. The stitching section 162 is concentric with and larger in diameter than the stitching section 160. The stitching section 162 is disposed entirely radially outside of the tether strap outer end portions including the end portions 132 and 144. The stitching section 162 extends entirely within the outer periphery 164 of the first tether pad 120.

The second tether pad 122 is identical in construction to the first tether pad 120. The second tether pad 122 is circular in shape with an outer periphery 170. The second tether pad 122 is disposed intermediate the air bag panel 14 and the inner end portions of the tether straps 104–118 including the inner end portions 138 and 150.

The inner end portions of the tether straps 104–118 are sewn to the second tether pad 122 by stitches that are arranged in a circular pattern to form a circular stitching section 172. The stitching section 172 is concentric with and greater in diameter than the stitching section 154. The second tether pad 122 is sewn to the air bag second panel 14 by stitches that are arranged in a circular pattern to form a circular stitching section 174. The stitching section 174 is concentric with and greater in diameter than the stitching section 172. The stitching section 174 is disposed entirely radially outside of the tether strap inner end portions including the inner end portions 138 and 150. The stitching section 174 is disposed entirely within the outer periphery 170 of the second tether pad 122.

The tether assembly 100 resists movement of the air bag first panel 12 away from the second panel 14, upon inflation of the air bag 16 in a manner as described above. The force applied by the air bag first panel 12, as it moves away from the second panel 14, is transmitted through the tether straps 104–118 of the tether assembly 100. The first tether pad 120 distributes the load from the tether straps 104–118 through the stitching section 162 and into the panel 12. The inner tether pad 122 transfers the load from the tether straps 104–118 through the stitching section 174 and into the second panel 14.

The center pad 102 of the tether assembly 100 distributes load between and among all the tether straps 104–118. Thus, if one of the tether straps 104–118 is more highly stressed or loaded than the others, the excess load on that one strap tends to be evened out or be distributed by the center pad 102.

For example, the first strap member 130 of the tether strap 108 transmits force of the outwardly moving air bag panel 12 into the center pad 102. A portion of that load is transmitted through the second strap member 136 of the tether strap 108 and into the air bag panel 14. However, a portion of the load transmitted from the first strap member 130 to the center pad 102 is assumed by some of the second strap members of the other tether straps 104, 106, and 110–118.

Accordingly, the center pad 102 tends to even out and distribute more evenly the load transmitted by the plurality of tether straps 104–118. This reduces the possibility of over-stressing the material of the panels 12 and 14 by transmitting excessive load through any given one of the tether straps 104–118. The center pad 102 also controls the lateral movement of the parts of the tether assembly 100, that is, in a direction to the left or right as viewed in FIG. 4.

It should be noted that a tether assembly in accordance with the present invention may incorporate a center pad such as the center pad 102, without also incorporating tether pads such as the tether pads 120 and 122. Further, one or all of the tether straps 104–118 may be joined to a tether pad 120 or 122 by a circular first stitching section as described above with reference to FIGS. 2–3.

Figure 8:
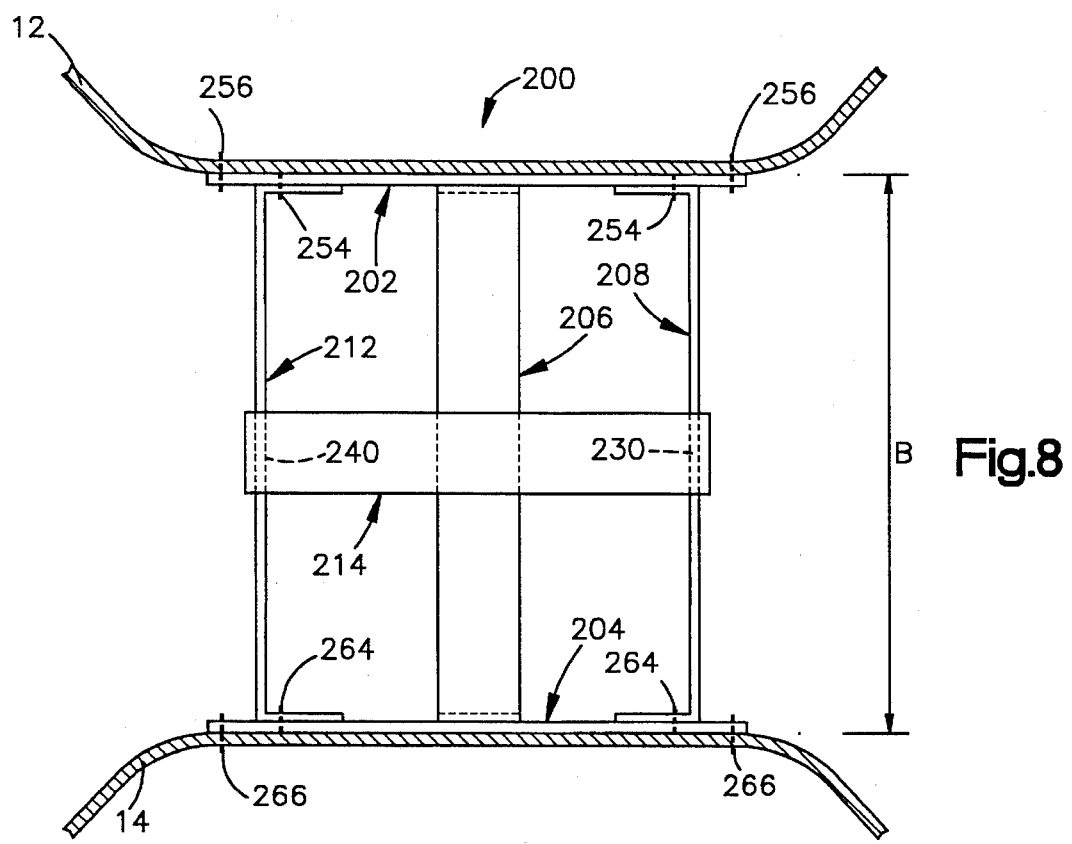
FIG. 8 is a view similar to FIG. 6 and showing the air bag in an inflated condition.
Figure 7:
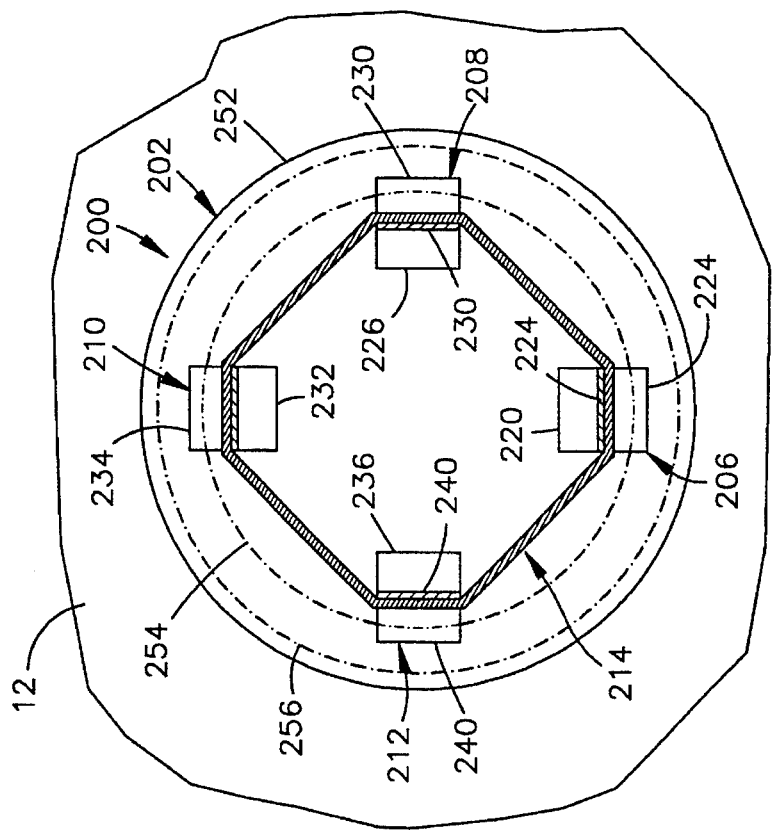
FIG. 7 is a sectional view taken along line 7—7 of FIG. 6.
Figure 6:
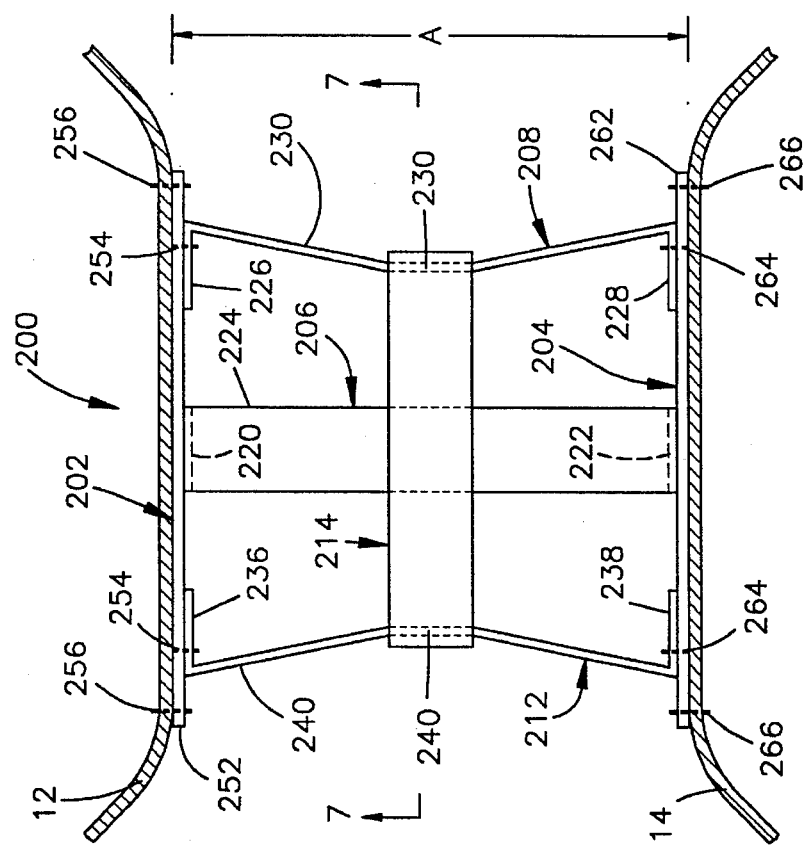
FIG. 6 illustrates a tether assembly in accordance with a third embodiment of the invention and showing an air bag in a partially inflated condition.

FIGS. 6–8 illustrate a tether assembly 200 in accordance with a third embodiment of the invention. The tether assembly 200 includes: first and second tether pads 202 and 204; four identical tether straps 206, 208, 210, and 212; and a stretchable member 214. The tether assembly 200 may be used in the air bag 16 in place of the tether assemblies 10 or 100.

The tether strap 206 (FIGS. 6 and 7) is a single continuous length of tether strap material having a first end portion 220, a second end portion 222, and an intermediate portion 224. The tether strap 208 likewise includes a first end portion 226, a second end portion 228, and an intermediate portion 230.

The tether strap 210 (FIG. 7) includes a first end portion 232, a second end portion (not shown), and an intermediate portion 234. The tether strap 212 (FIG. 6) includes a first end portion 236, a second end portion 238, and an intermediate portion 240.

The first tether pad 202 has a circular configuration with an outer periphery 252. The first tether pad 202 is disposed intermediate the first air bag panel 12 and the first end portions 220, 226, 232, and 236 of the tether straps. The first tether pad 202 is sewn to the tether strap first end portions by stitches that are arranged in a circular pattern to form a circular stitching section 254.

The first tether pad 202 is sewn to the air bag first panel 12 by stitches that are arranged in a circular pattern to form a circular stitching section 256. The stitching section 256 is concentric with and greater in diameter than the stitching section 254. The stitching section 256 is disposed entirely outside of, that is, does not intersect, the first end portions of the tether straps 206–212. The stitching section 256 is disposed entirely inside of, i.e., does not cross the outer periphery 252 of, the first tether pad 202.

The second tether pad 204 is identical in construction to the first tether pad 202. The second tether pad 204 is circular in configuration with an outer periphery 262. The second tether pad 204 is disposed intermediate the air bag second panel 14 and the second end portions 222, 228, and 238 of the tether straps 206–212. The second tether pad 204 is sewn to the tether strap second end portions by stitches that are arranged in a circular pattern to form a circular stitching section 264.

The second tether pad 204 is sewn to the air bag second panel 14 by stitches that are arranged in a circular pattern to form a circular stitching section 266. The stitching section 266 is concentric with and larger in diameter than the stitching section 264. The stitching section 266 is disposed radially outside of and does not intersect the second end portions of the tether straps 206–212. The circular stitching section 266 is disposed entirely inside of the tether pad 204 and does not cross its outer periphery 262.

The stretchable member 214 (FIGS. 6–8) may be made of an elastic material, in the nature of a rubber band. Alternatively, the stretchable member 214 may be made of a material, such as a fabric, which stretches (elongates) but does not then contract. The stretchable member is a single continuous loop of material and extends around and circumscribes the intermediate portions of the tether straps 206–212. The stretchable member 214 is connected with the tether straps 206–212, for example by sewing, at enough points to block movement of the stretchable member relative to the tether straps.

The tether assembly 200 is shown in FIG. 6 with the air bag 16 in a partially inflated condition, for example, with one to two p.s.i. of fluid pressure within the air bag. The air bag panels 12 and 14 are spaced apart by a distance marked A in FIG. 6. The tether straps 206, 208, 210, and 212 are only partially extended and are not straight. The stretchable member 214 is relaxed, not stretched.

As the fluid pressure increases in the air bag 16, the air bag panels 12 and 14 move farther away from each other. The tether straps 206, 208, 210, and 212 straighten, move farther from each other, and extend fully as the air bag 16 assumes the inflated condition shown in FIG. 8. As the tether straps straighten and extend, the stretchable member 214 resists movement of the tether strap intermediate portions radially outward from the condition shown in FIG. 7 to the condition shown in FIG. 8. However, the pressure of the inflation fluid in the air bag 16 overcomes the resistance of the stretchable member 214 and moves the parts of the tether assembly 200 to the condition shown in FIG. 8.

When the air bag 16 is fully inflated and the tether assembly 200 is in the condition illustrated in FIG. 8, the tether straps 206, 208, 210, and 212 are fully extended. The air bag panels 12 and 14 are spaced apart by a distance marked B in FIG. 8. The distance marked B in FIG. 8 is larger than the distance marked A in FIG. 6. The stretchable member 214 is in a stretched condition. The stretchable member is longer when in the stretched condition (FIG. 8) than it is when in the relaxed condition (FIG. 7).

A certain amount of time and energy is needed to overcome the resistance to stretching of the stretchable member 214 as described above. That is, it takes slightly longer for the parts of the tether assembly 200 to move from the condition shown in FIG. 6 to the condition shown in FIG. 8, against the resistance of the stretchable member 214, than it would were the stretchable member 214 not present in the tether assembly. Thus, it takes slightly longer for the force of the inflating air bag 16 to be transmitted through the tether straps 206, 208, 210 and 212, and through the tether pads 202 and 204, into the air bag panels 12 and 14. Since the same amount of force is transmitted through the tether assembly 200 into the bag panels 12 and 14 over a longer period of time, the maximum instantaneous load on the stitching sections 256 and 266—that is, the highest load to which the stitching sections are subjected during the period of inflation—is reduced. This reduces the maximum stress at the bag/stitching interface.

It should be understood that the stretchable member 214 may be incorporated in a tether assembly such as the tether assembly 200 which does not include tether pads such as the tether pads 202 and 204.

From the above description of the invention, those skilled in the art will perceive improvements, changes and modifications in the invention. For example, a tether assembly in accordance with the present invention could extend between and interconnect an air bag housing or inflator and one panel of an air bag, rather than two panels of an air bag. Such improvements, changes and modifications within the skill of the art are intended to be covered by the appended claims.

Having described the invention, we claim:

1. An inflatable vehicle occupant restraint for, when inflated, restraining a vehicle occupant, said inflatable restraint having an uninflated condition and an inflated condition, said inflatable restraint comprising:

first and second panels spaced from each other when said inflatable restraint is in the inflated condition and at least partially defining between them an inflation fluid volume; and tether means connected between said first and second panels for resisting movement of said first panel away from said second panel;

said tether means comprising an intermediate pad and a tether strap;

said tether strap having a first end portion bounded by edges of said tether strap first end portion;

a circular first stitching section joining said tether strap first end portion to said intermediate pad, said first stitching section being disposed within said edges of said tether strap first end portion and being free of engagement with said first panel;

a circular second stitching section joining said intermediate pad to said first panel, said second stitching section being disposed outside of said circular first stitching section and being free of engagement with said tether strap.

2. An inflatable vehicle occupant restraint as set forth in claim 1 wherein said second stitching section is concentric with and greater in diameter than said first stitching section.

3. An inflatable vehicle occupant restraint as set forth in claim 2 wherein said intermediate pad is disposed between and extends generally parallel to said first end portion and said first panel.

4. An inflatable vehicle occupant restraint for, when inflated, restraining a vehicle occupant, said inflatable restraint having an uninflated condition and an inflated condition, said inflatable restraint comprising:

first and second panels which, when said inflatable restraint is inflated, are spaced from each other and at least partially define between them an inflation fluid volume;

first and second tether straps each connected between said first and second panels for resisting movement of said first panel away from said second panel;

said tether straps having an unextended condition when said inflatable restraint is in the uninflated condition and having an extended condition when said inflatable restraint is in the inflated condition; and means for resisting movement of said tether straps from the unextended condition to the extended condition upon inflation of said inflatable restraint, comprising a stretchable member connected between said tether straps, said stretchable member having a first length when said tether straps are in the unextended condition and having a second length greater than said first length when said tether straps are in the extended condition.

5. An inflatable vehicle occupant restraint as set forth in claim 4 wherein said stretchable member comprises a loop of material extending around said first and second tether straps.

6. An inflatable vehicle occupant restraint as set forth in claim 5 wherein said tether straps are spaced apart from each other by a first distance when said inflatable restraint is in the uninflated condition and are spaced apart from each other by a second distance when said inflatable restraint is in the inflated condition, said second distance being greater than said first distance.

7. An inflatable vehicle occupant restraint as set forth in claim 4 comprising first and second intermediate pads, said first tether strap having first and second opposite end portions and said second tether strap having first and second opposite end portions, said first intermediate pad joining together said first end portions of said tether straps and being disposed intermediate said tether straps and said first panel, said second intermediate pad joining together said second end portions of said tether straps and being disposed intermediate said tether straps and said second panel.

8. An inflatable vehicle occupant restraint as set forth in claim 7 comprising a first curved stitching section joining said first intermediate pad to said first panel at a location disposed laterally outside said tether strap first end portions and a second curved stitching section joining said second intermediate pad to said second panel at a location disposed laterally outside said tether strap second end portions, said first and second curved stitching sections being concentric with each other.

9. An inflatable vehicle occupant restraint for, when inflated, restraining a vehicle occupant, said inflatable restraint having an uninflated condition and an inflated condition, said inflatable restraint comprising:

first and second panels spaced from each other when said inflatable restraint is in the inflated condition and at least partially defining between them an inflation fluid volume, and tether means connected between said first and second panels for resisting movement of said first panel away from said second panel;

said tether means comprising a tether strap having first and second end portions and an intermediate portion extending between said first and second end portions, and an intermediate pad;

a first stitching section joining said first end portion of said tether strap to said intermediate pad;

a second stitching section joining said intermediate pad to said first panel at a location disposed laterally outside said first and second end portions and spaced from said first stitching section thereby to connect said first end portion of said tether strap to said first panel;

a second tether strap connected between said first and second panels for resisting movement of said first panel away from said second panel;

said tether straps having an unextended condition when said inflatable restraint is in the uninflated condition and an extended condition when said inflatable restraint is in the inflated condition; and means for resisting movement of said tether straps from the unextended condition to the extended condition upon inflation of said inflatable restraint, comprising a stretchable member connected between said tether straps, said stretchable member having a first length when said tether straps are in the unextended condition and having a second length greater than said first length when said tether straps are in the extended condition.

10. An inflatable vehicle occupant restraint for, when inflated, restraining a vehicle occupant, said inflatable restraint having an uninflated condition and an inflated condition, said inflatable restraint comprising:

a first panel having an inflated position when said inflatable restraint is in the inflated condition and at least partially defining an inflation fluid volume, and tether means connected with said first panel for resisting movement of said first panel;

said tether means comprising a tether strap having first and second end portions and an intermediate portion extending between said first and second end portions, and an intermediate pad;

a first stitching section joining said first end portion of said tether strap to said intermediate pad;

a second stitching section joining said intermediate pad to said first panel at a location disposed laterally outside said first end portion and spaced from said first stitching section thereby to connect said first end portion of said tether strap to said first panel;

a second tether strap connected with said first panel for resisting movement of said first panel, said tether straps having an unextended condition when said inflatable restraint is in the uninflated condition and an extended condition when said inflatable restraint is in the inflated condition; and means for resisting movement of said tether straps from the unextended condition to the extended condition upon inflation of said inflatable restraint, comprising a stretchable member connected between said tether straps, said stretchable member having a first length when said tether straps are in the unextended condition and having a second length greater than said first length when said tether straps are in the extended condition.

11. An inflatable vehicle occupant restraint for, when inflated, restraining a vehicle occupant, said inflatable restraint having an uninflated condition and an inflated condition, said inflatable restraint comprising:

first and second panels spaced from each other when said inflatable restraint is in the inflated condition and at least partially defining between them an inflation fluid volume, and tether means connected between said first and second panels for resisting movement of said first panel away from said second panel;

said tether means comprising a tether strap having first and second end portions and an intermediate portion extending between said first and second end portions, and an intermediate pad;

a first stitching section joining said first end portion of said tether strap to said intermediate pad; and a second stitching section joining said intermediate pad to said first panel at a location disposed laterally outside said first and second end portions and spaced from said first stitching section thereby to connect said first end portion of said tether strap to said first panel, said intermediate pad at said first stitching section being unattached to said first panel.

12. An inflatable vehicle occupant restraint as set forth in claim 11 wherein said first end portion of said tether strap extends generally parallel to said first panel when said inflatable restraint is in the inflated condition, said intermediate pad being disposed between and extending generally parallel to said first end portion and said first panel, said first stitching section having a curved configuration and being disposed within said first end portion, said second stitching section having a curved configuration and being disposed outside of said first end portion and having a larger diameter than said first stitching section and being concentric with said first stitching section.

13. An inflatable vehicle occupant restraint as set forth in claim 12 wherein said tether means comprises a second intermediate pad connecting said second end portion of said tether strap to said second panel, a third curved stitching section joining said second end portion of said tether strap to said second intermediate pad, and a fourth curved stitching section joining said second intermediate pad to said second panel at a location disposed laterally outside said second end portion and spaced from said third curved stitching section, said fourth curved stitching section having a larger diameter than said third curved stitching section.

14. An inflatable vehicle occupant restraint as set forth in claim 13 wherein said tether strap comprises first and second intermediate portions extending between said first and second panels of said inflatable restraint, said tether strap first end portion interconnecting first ends of said first and second intermediate portions and said tether strap second end portion interconnecting second ends of said first and second intermediate portions, said intermediate portions extending parallel to each other and transverse to said end portions when said inflatable restraint is in the inflated condition.

15. An inflatable vehicle occupant restraint as set forth in claim 11 comprising:

a second tether strap connected between said first and second panels for resisting movement of said first panel away from said second panel; and means for distributing the force of inflation of said inflatable restraint between said tether straps, comprising a center pad connected between respective central portions of said tether straps, said center pad extending generally parallel to said first and second panels and transverse to said tether straps when said inflatable restraint is in the inflated condition.

16. An inflatable vehicle occupant restraint for, when inflated, restraining a vehicle occupant, said inflatable restraint having an uninflated condition and an inflated condition, said inflatable restraint comprising:

first and second panels which, when said inflatable restraint is inflated, are spaced from each other and at least partially define between them an inflation fluid volume;

said first and second panels extending generally parallel to each other in a first direction when said inflatable restraint is in the inflated condition;

a plurality of tether straps disposed in a spaced array between said first and second panels for resisting movement of said first panel away from said second panel;

each of said tether straps having a first end portion connected with said first panel, a second end portion connected with said second panel, and a central portion intermediate said first and second end portions;

said tether straps extending generally perpendicular to said first and second panels in a second direction when said inflatable restraint is in the inflated condition; and means for distributing the force of inflation of said inflatable restraint between said tether straps, comprising a center pad connected between respective central portions of said plurality of tether straps.

17. An inflatable vehicle occupant restraint as set forth in claim 16 wherein said tether straps are disposed in a circular array about an axis, said center pad having a circular shape, said tether straps being connected to an outer peripheral portion of said center pad, said center pad extending generally parallel to said first and second panels and generally perpendicular to said tether straps in the first direction when said inflatable restraint is in the inflated condition.

18. An inflatable vehicle occupant restraint as set forth in claim 16 wherein each of said tether straps comprises a pair of first and second strap members having central end portions joined to each other and to said center pad, said first strap members having end portions opposite their central end portions which are connected with said first panel, and said second strap members having end portions opposite their central end portions which are connected with said second panel.

19. An inflatable vehicle occupant restraint as set forth in claim 16 comprising first and second intermediate pads, said first intermediate pad joining together said first end portions of said tether straps and being disposed intermediate said tether straps and said first panel, said second intermediate pad joining together said second end portions of said tether straps and being disposed intermediate said tether straps and said second panel.

20. An inflatable vehicle occupant restraint as set forth in claim 19 comprising a circular first stitching section joining said first intermediate pad to said first panel at a location disposed laterally outside said tether strap first end portions and a circular second stitching section joining said second intermediate pad to said second panel at a location disposed laterally outside said tether strap second end portions.

21. An inflatable vehicle occupant restraint for, when inflated, restraining a vehicle occupant, said inflatable restraint having an uninflated condition and an inflated condition, said inflatable restraint comprising:

a first panel having an inflated position when said inflatable restraint is in the inflated condition and at least partially defining between them an inflation fluid volume, and tether means connected with said first panel for resisting movement of said first panel;

said tether means comprising a tether strap having first and second end portions and an intermediate portion extending between said first and second end portions, and an intermediate pad;

a first stitching section joining said first end portion of said tether strap to said intermediate pad; and a second stitching section joining said intermediate pad to said first panel at a location disposed laterally outside said first and second end portions and spaced from said first stitching section thereby to connect said first end portion of said tether strap to said first panel, said intermediate pad at said first stitching section being unattached to said first panel.

22. An inflatable vehicle occupant restraint as set forth in claim 21 wherein said first end portion of said tether strap extends generally parallel to said first panel when said inflatable restraint is in the inflated condition, said intermediate pad being disposed between and extending generally parallel to said first end portion and said first panel, said first stitching section having a circular configuration and being disposed within said first end portion, said second stitching section having a circular configuration and a larger diameter than said first stitching section.

23. An inflatable vehicle occupant restraint as set forth in claim 21 comprising:

a second tether strap connected with said first panel for resisting movement of said first panel; and means for distributing the force of inflation of said inflatable restraint between said tether straps, comprising a center pad connected between respective central portions of said tether straps, said center pad extending generally parallel to said first panel and transverse to said tether straps when said inflatable restraint is in the inflated condition.

* * * * *